(12) United States Patent
Harju

(10) Patent No.: US 7,726,064 B2
(45) Date of Patent: Jun. 1, 2010

(54) FOLDING CRUSTACEAN TRAP

(75) Inventor: James Harju, Desmoines, WA (US)

(73) Assignee: STOW-B-LOW.net, LLC, Des Moines, WA (US)

( * ) Notice: Subject to any disclaimer, the term of this patent is extended or adjusted under 35 U.S.C. 154(b) by 0 days.

(21) Appl. No.: 12/004,436

(22) Filed: Dec. 19, 2007

(65) Prior Publication Data

US 2008/0172927 A1 Jul. 24, 2008

Related U.S. Application Data

(60) Provisional application No. 60/876,006, filed on Dec. 19, 2006.

(51) Int. Cl.
*A01K 69/10* (2006.01)
(52) U.S. Cl. .......................... 43/105; 43/102
(58) Field of Classification Search .. 43/105; A01K 69/10

See application file for complete search history.

(56) References Cited

U.S. PATENT DOCUMENTS

| | | | | |
|---|---|---|---|---|
| 1,403,171 A | * | 1/1922 | Koenig | 43/105 |
| 1,463,062 A | * | 7/1923 | Roberts | 43/105 |
| 2,652,656 A | * | 9/1953 | Glasser | 43/105 |
| 4,182,068 A | * | 1/1980 | Iannucci | 43/105 |
| 4,406,083 A | * | 9/1983 | Hart | 43/105 |
| 4,765,088 A | * | 8/1988 | Stuart | 43/102 |
| 5,555,666 A | * | 9/1996 | Glatzer | 43/17 |
| 5,673,510 A | * | 10/1997 | Campbell | 43/105 |
| 2009/0217567 A1 | * | 9/2009 | Teo | 43/105 |

* cited by examiner

*Primary Examiner*—Son T Nguyen
*Assistant Examiner*—Marisa Conlon
(74) *Attorney, Agent, or Firm*—Dean A. Craine

(57) ABSTRACT

A crustacean trap that includes a collapsible frame assembly surrounded by a collapsible net body. The frame assembly includes a lower collar perpendicularly aligned and attached to a hollow mast. The mast extends upward from the lower collar and slides through an upper collar. Pivotally attached to the upper collar are four radially aligned upper legs. Pivotally coupled to the lower end of each upper leg is a lower leg that is vertically aligned under the upper leg. Each lower leg extends inward and pivotally connects to the lower collar. The upper and lower collars are aligned and registered so when the mast is extended downward through the upper collar, the upper collar and the lower collar separate thereby forcing each upper leg diagonally downward from the upper collar and forcing each lower leg horizontally outward from the lower collar.

16 Claims, 7 Drawing Sheets

FOLDING CRUSTACEAN TRAP

This is a utility patent application which claims benefit of U.S. Provisional Application No. 60/876,006 filed on Dec. 19, 2006.

BACKGROUND OF THE INVENTION

1. Field of the Invention

This invention relates to animal traps, and more particularly to traps placed in water used to catch crustaceans.

2. Description of the Related Art

Traps positioned by fishermen in water from a boat or dock are used to catch crabs and other types of crustaceans. Crustacean traps are cage-like structures temporarily stacked on the upper deck of the boat. Crab bait is placed into the trap before it is dropped into the water where crabs are believed to be located. The traps slowly sink to the floor of the water so that the crabs may crawl along the floor and into the trap and reach the bait. After waiting 1 to 24 hrs, the traps are then retrieved and lifted on board the boat or dock where the crabs in the traps are removed and processed.

Ideally, the crab traps should fold into a compact configuration on board the boat or dock when not in use. Also, the traps should be sufficiently heavy so that they sink vertically in the body of water and then remain relatively stationary on the floor. Also, the crab openings on the trap should be sufficiently wide so that crabs can easily enter the trap and retain them inside the trap.

SUMMARY OF THE INVENTION

The above stated objects are made by the folding pyramid shaped net crustacean trap described herein that includes a pyramid-shaped net body that selectively folds between an extended position to a narrow compact configuration for storage. The trap includes a rigid frame assembly that supports the net body in the extended position. The frame assembly includes four pivoting legs that unfold and expand to support the side panels and bottom panel of the net body in the extended position. The frame assembly includes a hollow mast that is perpendicularly aligned with the net body's bottom panel when placed in an expanded position.

The lower end of the mast is positioned inside the net body and permanently or temporarily attached to the lower collar. The mast extends upward from the lower collar and slides through a perpendicularly aligned upper collar. Each leg includes an upper leg segment and a lower leg segment. The upper ends of the upper leg segments are pivotally attached to the upper collar and extend diagonally downward. Pivotally coupled to the lower end of each upper leg segment is a lower leg segment. Each lower leg segment extends inward from the distal end of the upper leg segment and is pivotally attached at its proximal end to the lower collar. When assembled, the lower and upper collars, the lower leg segments, and the lower portions of the mast are all positioned inside the net body. The upper and lower collars are aligned and registered so that when the mast slides downward through the upper collar, the upper collar and the lower collar are forced apart and the lower leg segments are pulled downward and each upper leg diagonally outward and downward. In one embodiment, the mast slides into a short tube attached to the lower collar. An elastic cord extends through the mast and connects at one end to the lower collar thereby enabling the mast to disengage from the lower collar and to be completely pulled from the net body and stored along the folded net body to shorten its overall height. Also, a pull line is attached to the upper collar and used to position and pull the trap from the water.

In another embodiment, the trap includes two one-way side openings formed on the sides of the net body, an optional bait holder, and optional weights.

DESCRIPTION OF THE DRAWINGS

FIG. 8 is a side elevational view of the upper collar with the mast extending there through.

DESCRIPTION OF THE PREFERRED EMBODIMENT(S)

Figure 1:
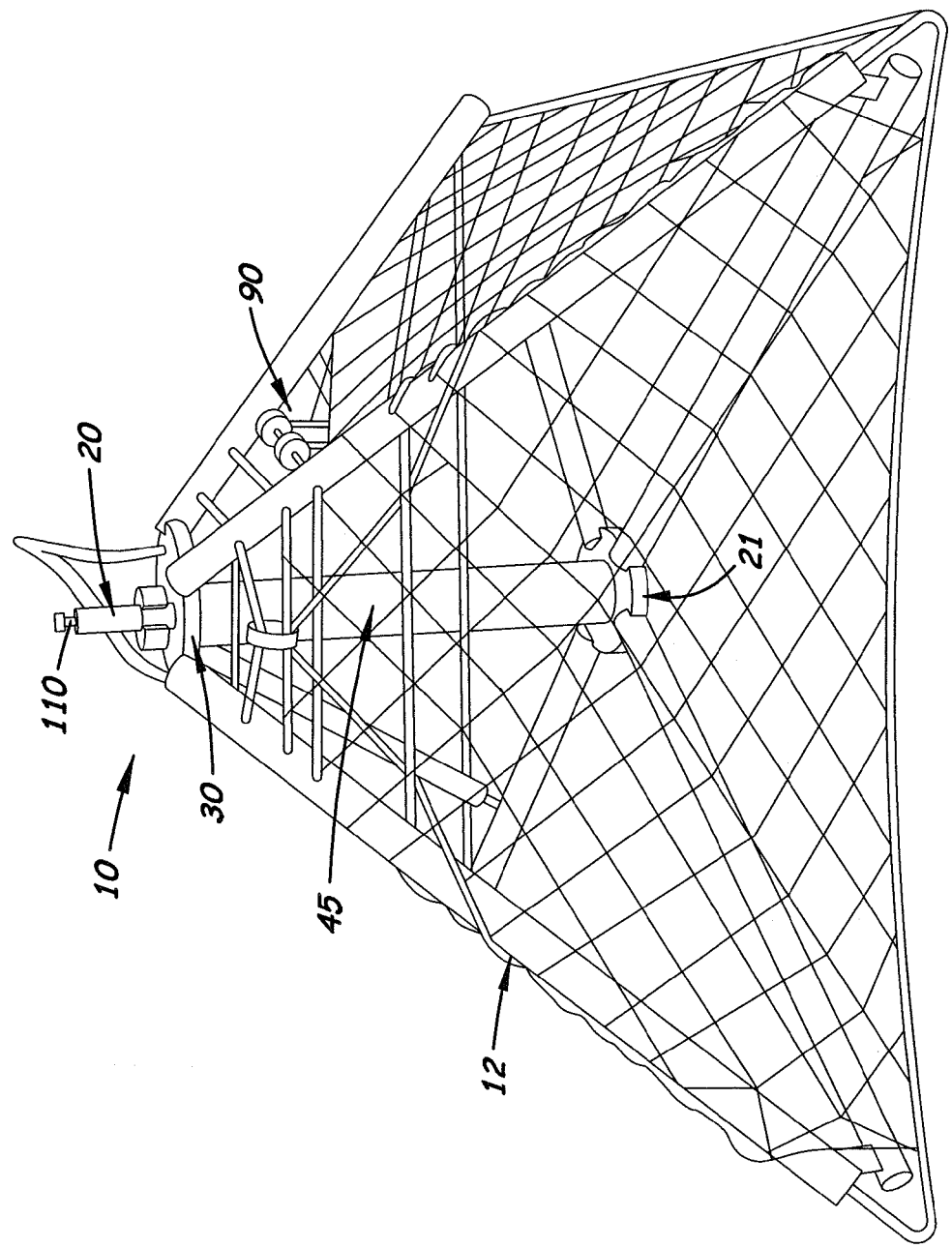
FIG. 1 is a perspective view of a folding crustacean trap shown in an extended position ready for operation.
Figure 2:
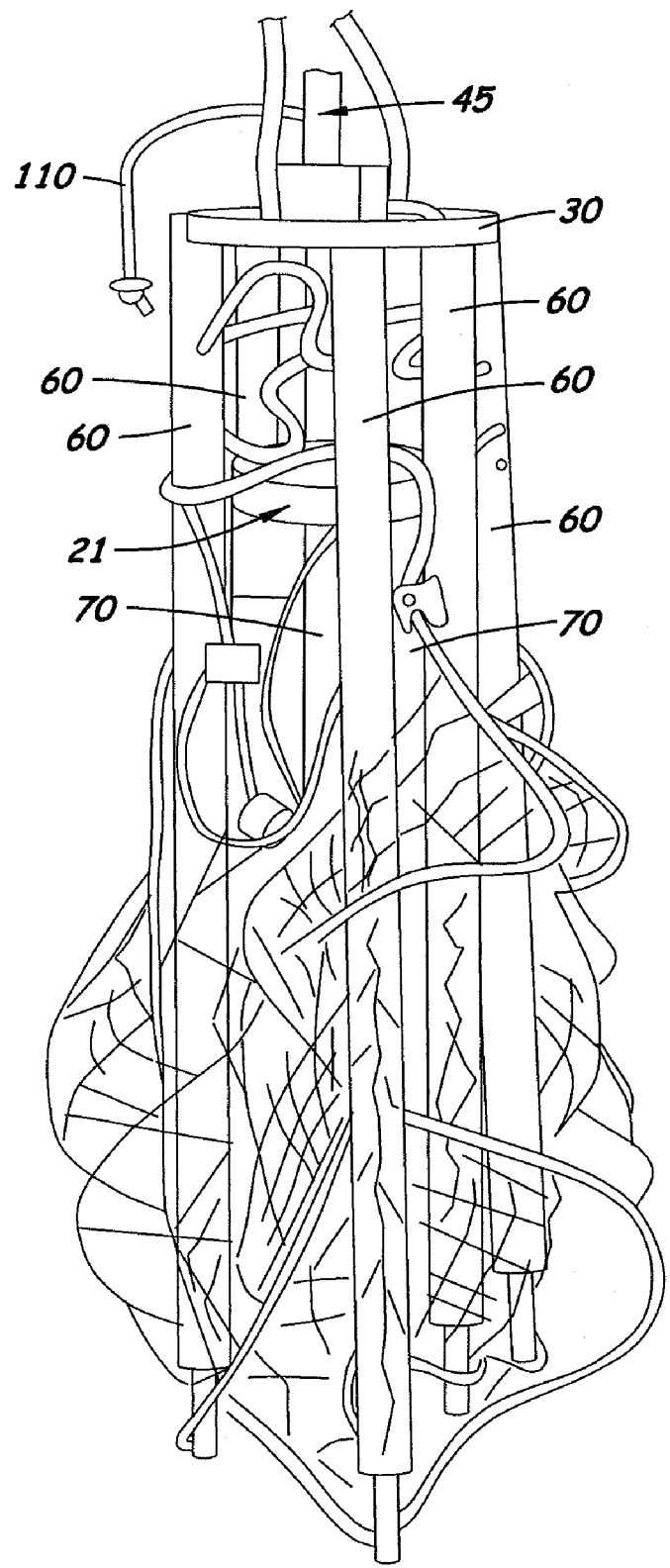
FIG. 2 is a perspective view of the folding crustacean trap shown in FIG. 1 in a folded position for storage.
Figure 3:
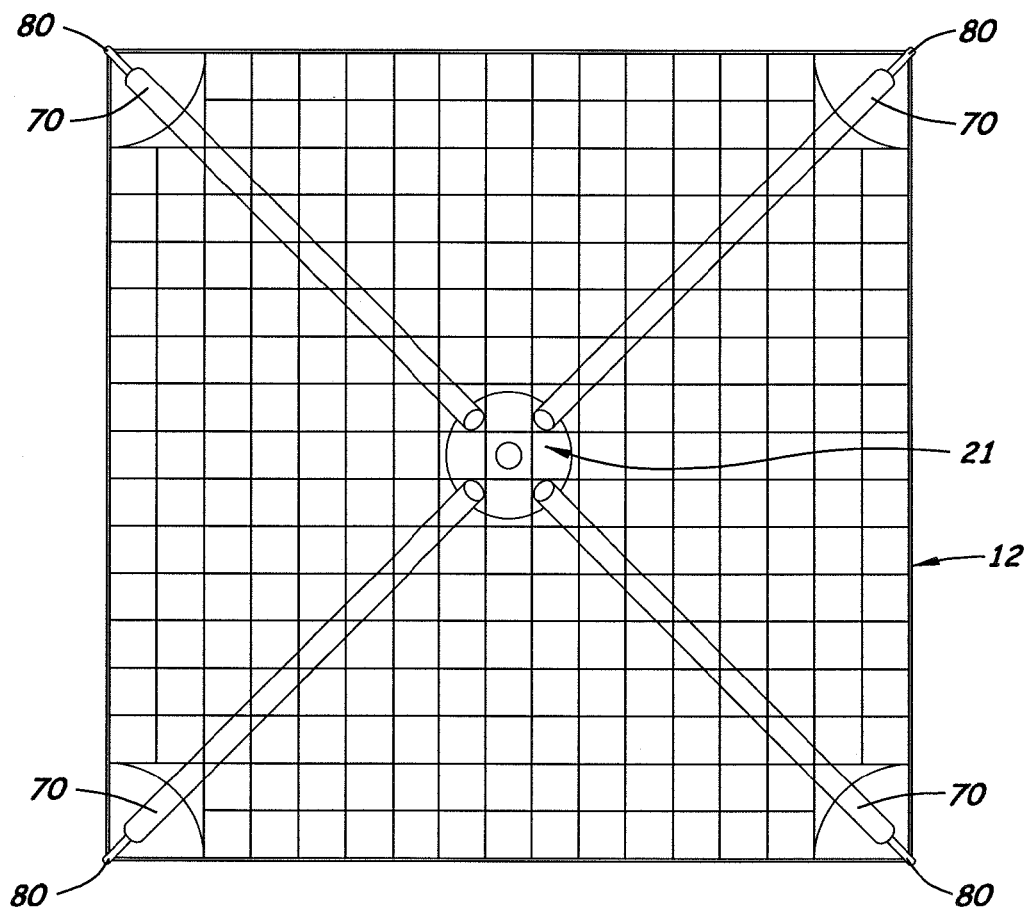
FIG. 3 is a bottom plan view of the folding crustacean trap in the extending position.

Referring to the accompanying Figs. there is shown a folding crustacean trap generally indicated by the reference number 10, design to be manually moved between an extended position shown in FIG. 1 used to catch crustaceans and a compact folded position shown in FIG. 2 used for storage. The trap 10 includes a net body 12 supported in an extended position by a folding frame assembly 20. The frame assembly 20 includes a lower collar 21 attached to the lower end of a hollow mast 45. Disposed around the mast 45 and spaced above lower collar 21 is a sliding upper collar 30.

The lower collar 21 is a disc-like circular structure slightly smaller in diameter than the upper collar 30. In the first embodiment, the mast 45 is perpendicularly aligned and permanently attached over the center axis of the lower collar 21. Formed on the perimeter edge of the lower collar 21 are four radially aligned semi-circular cutouts 23.

Figure 4:
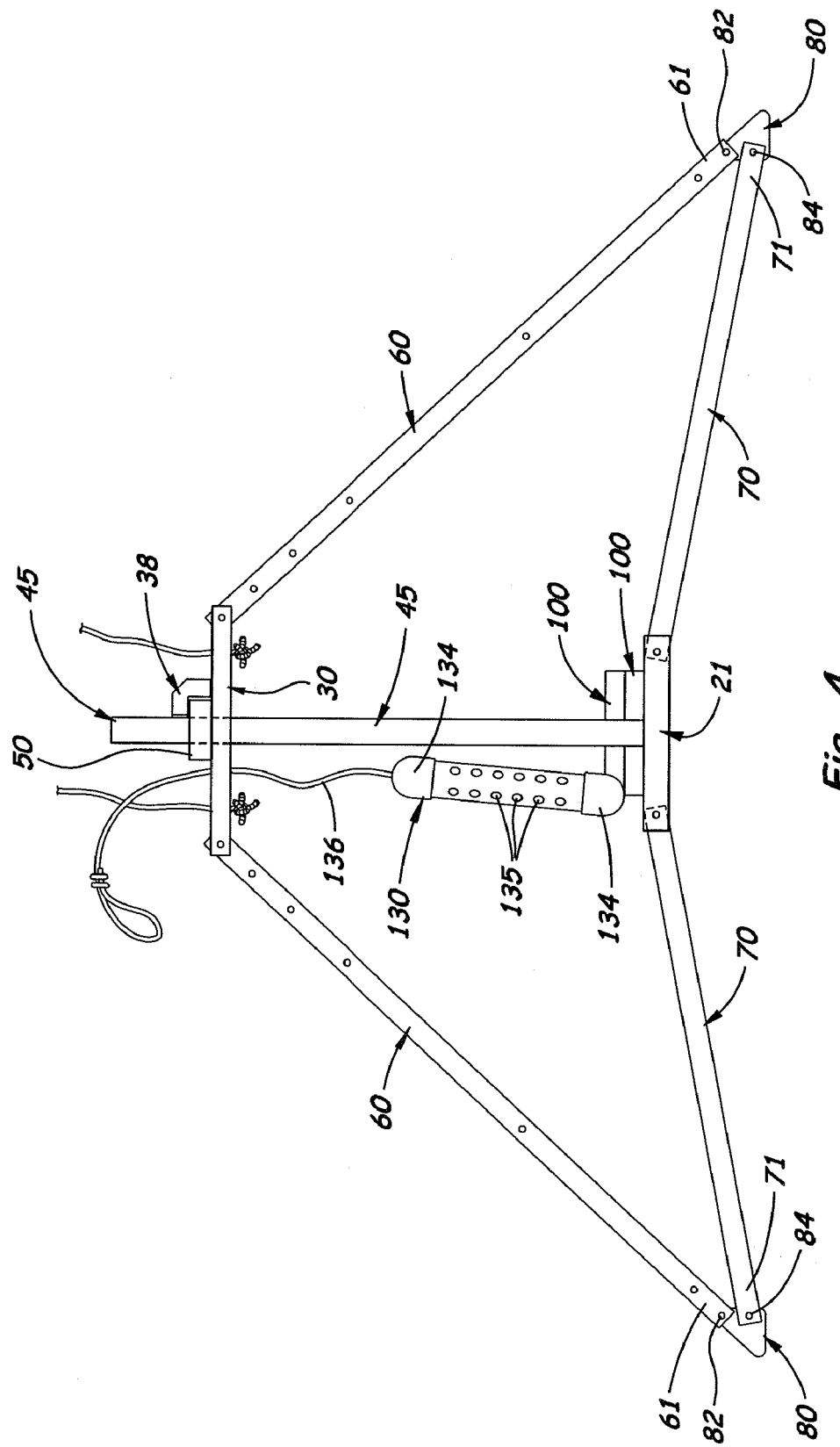
FIG. 4 is a side elevational view of the folding crustacean trap with the net removed showing the collapsing frame in the extended position.
Figures 5, 6, 7:
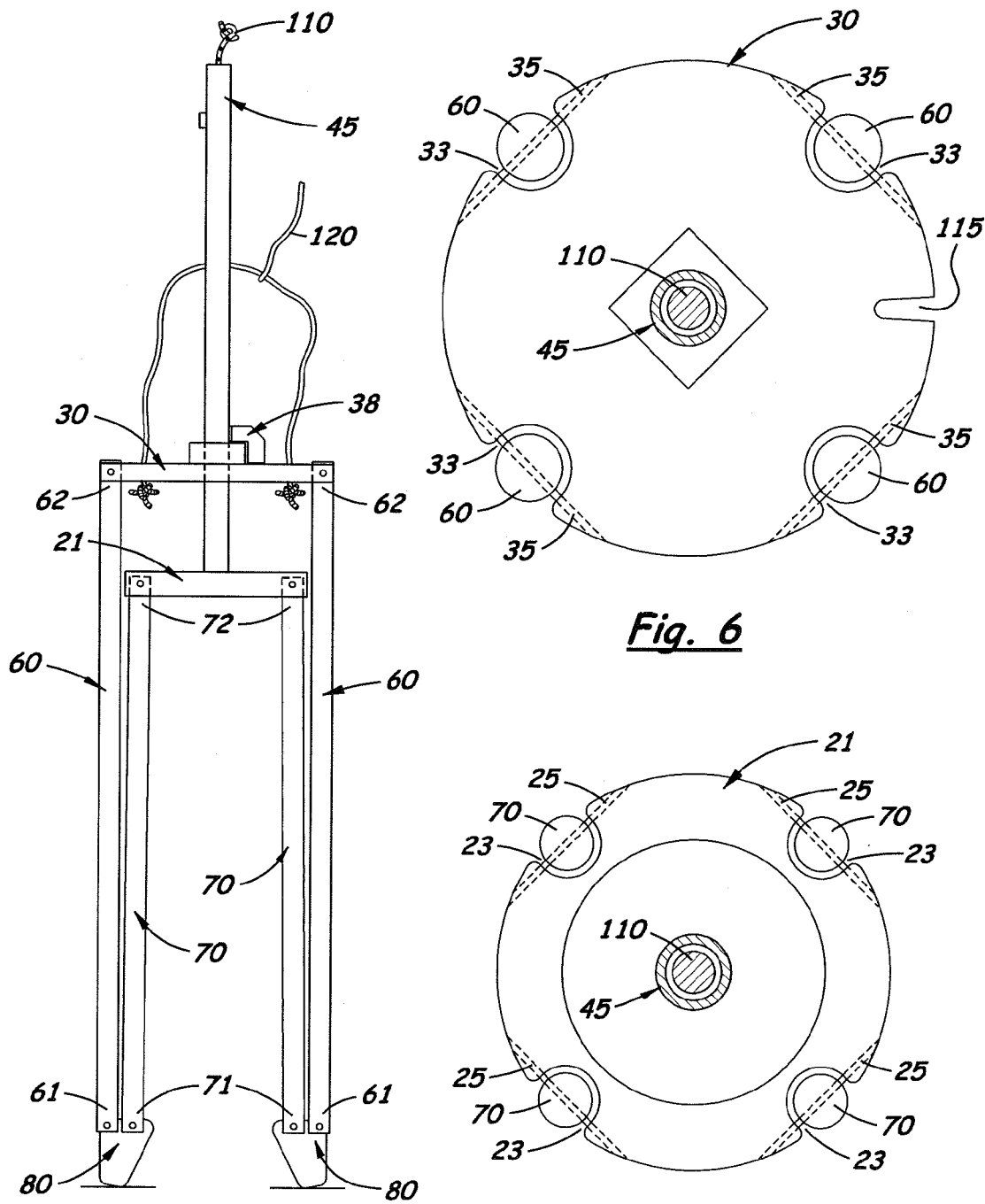
FIG. 5 is a side elevational view of the collapsing frame shown in FIG. 4 in a folded position.
FIG. 6 is a sectional top plan view of the folding crustacean trap taken along line 6-6, in FIG. 5.
FIG. 7 is a top plan view of the lower collar.
Figure 8:
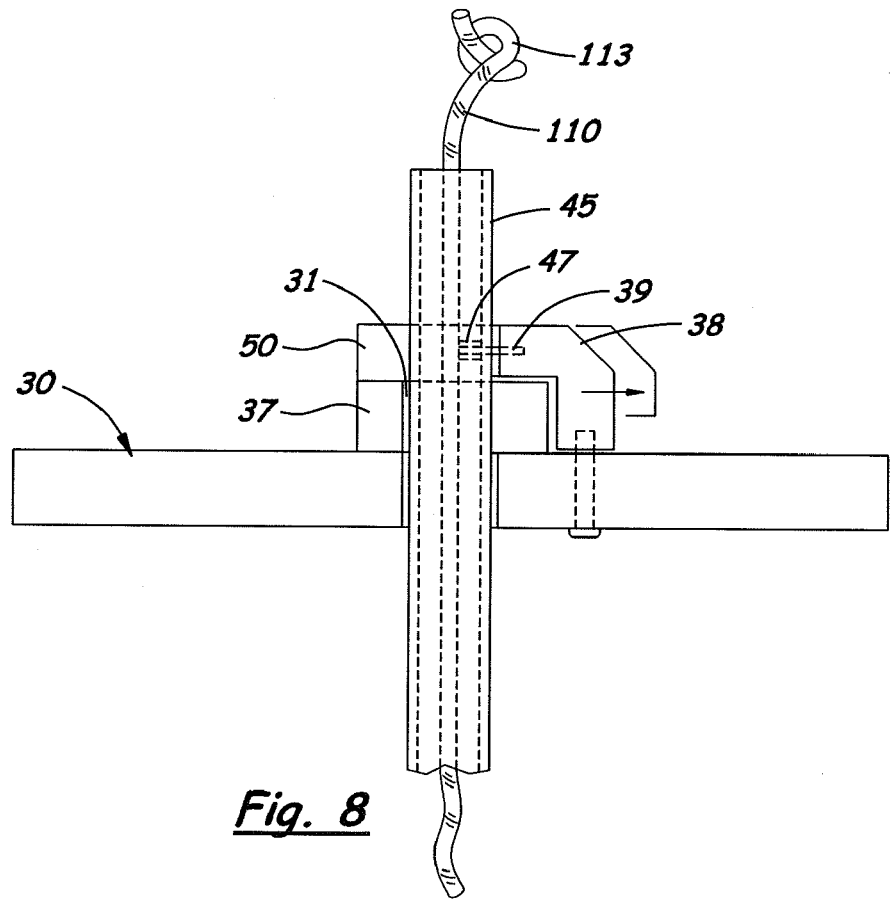
Figure 9:
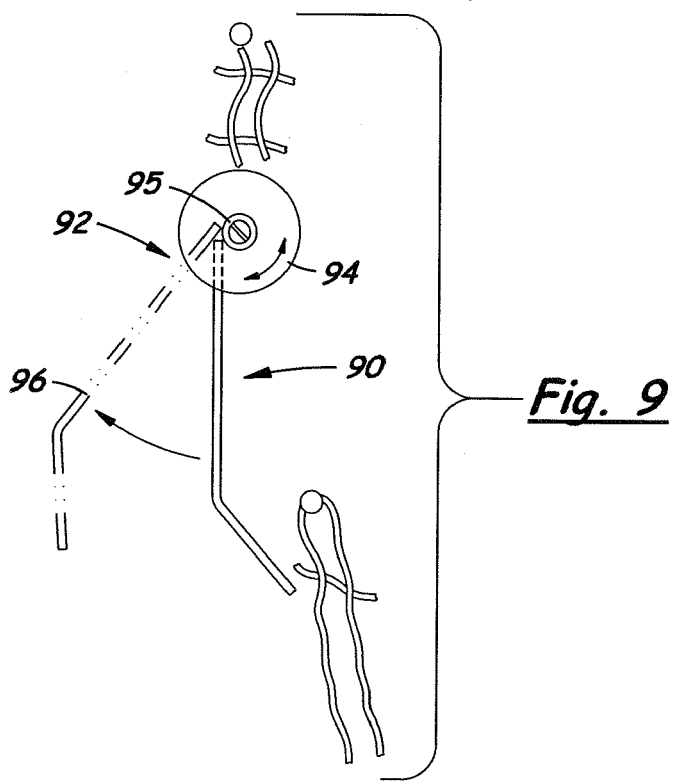
FIG. 9 is a side elevational view of the side opening being moved from a closed to an open position.
Figure 10:
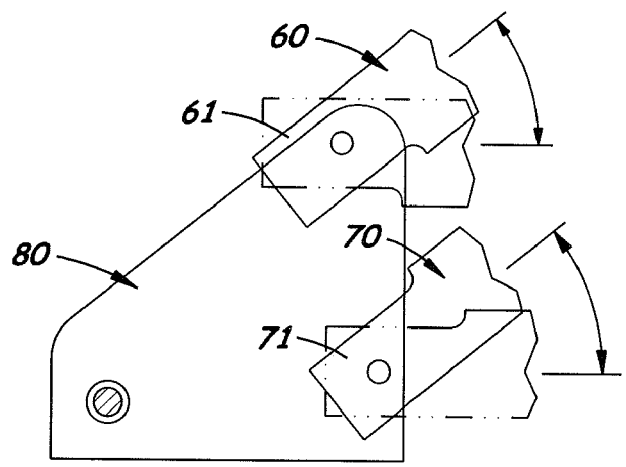
FIG. 10 is a side elevational view of a foot showing the pivoted connection of an upper leg and a lower leg.

As shown in FIGS. 4, 6 and 8, the upper collar 30 is also a disc-like circular structure with four radially aligned semi-circular cutouts 33 formed around its perimeter edge. Located centrally in the upper collar 30 is an upper collar 30 with a center bore 31 formed therein through which the mast 45 slides freely. In the preferred embodiment, the mast 45 includes a stop surface 50 attached or formed near its proximal end that prevents the upper end of the mast 45 from being pushed downward through the upper collar 30. Disposed between the mast 45 and the upper collar 30 is a means for locking the upper collar 30 in a fixed position on the mast 45. In the preferred embodiment, the means for locking is a slide lock 38 mounted on the top surface of the upper collar 30 with a laterally aligned pin 39. As shown in FIG. 8, during use the slide lock 38 slides over the top surface of the upper collar 30 and forces the pin 39 through a pin hole 47 formed on the mast 45 to lock the upper collar 30 in position on the mast 45. When the upper collar 30 is locked on the mast 45, the trap 10 is held in an extended position.

Positioned inside each cutout 33 formed on the upper collar 30 is the proximal end 61 of an upper leg segment 60. A pin 35 extends through the upper collar 30 and transverses the cutout 33 and the proximal end 61 of the upper leg segment 60 to hold the upper leg segment 60 in place. The pin 35 enables each upper leg segment 60 to pivot approximately 60 degrees from a perpendicularly aligned position to a diagonally aligned, outward position as shown in FIGS. 1 and 4.

As stated above, the cutouts 23 on the lower collar 21 are aligned and registered with the cutouts 33 formed on the upper collar 30. Positioned inside each cutout 23 is the proximal end of a lower leg segment 70. A pin 25 extends through the lower collar 21 and transverses the cutout 23 and the proximal end 72 of the lower leg segment 70. When attached to the lower collar 21, each lower leg segment 70 is able to pivot approximately 100 degrees from a vertical position to a horizontal position.

The distal ends 61, 71 of the upper and lower leg segments 60, 70, respectively, are pivotally connected a foot 80. In the preferred embodiment, the foot 80 is a vertically aligned, triangular plate. During assembly, the upper corner of the foot 80 is inserted into the proximal end 72 of the upper leg segment 60. A pin 82 attaches the foot 80 to the upper leg segment 60. The inside corner of the foot 80 is inserted into the proximal end of the lower leg segment 70. A second pin 84 is used to attach the lower leg segment 70 to the foot 80. During use, the adjacent upper leg segment 60 and lower leg segment 70 are able to fold together in a position substantially parallel to the mast 45 to a compact configuration.

Figure 11:
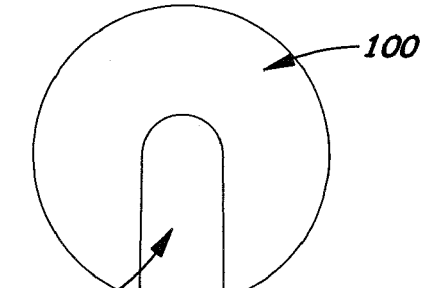
FIG. 11 is a top plan view of the lower collar with two weights being placed thereon.

As shown in FIGS. 4 and 11, attached to the mast 45 and resting on the lower collar 21 is at least one weight 100 designed to hold the trap 10 on the bottom of a body of water. In the preferred embodiment, the weight 100 is a disk structure with a radially aligned slot opening 102 formed thereon that allows the weight 100 to laterally slide onto the mast 45. In the preferred embodiment, each weight 100 is approximately 3 pounds. It should be understood that the weight 100 may be exchanged with heavier or lighter weights depending on the water conditions.

The net body 12 is a five side pyramid-like structure made of poly-rope or poly-cord. When unfolded and expanded, the net body 12 forms a four-sided pyramid with four side panels and a bottom panel. Formed on at least one diagonal side of the net body 12 near the mid-line axis of each side panel is a one-way opening 90. In the preferred embodiment, two one-way openings 90 are provided. Each opening 90 includes two swing rods 92. Each swing rod 92 includes an upper circular disc body 94 suspended on a rope 95 that extends horizontally between two upper legs 60. The circular disc body 94 is able to rotate freely over the rope 95. Extending downward from each circular body 94 is a bend rod 96. The rod 96 is axially offset on the circular disc sides body 94 so that the rod 96 swings forward against the sides of the net adjacent to the side opening 90 to close the side opening 90 and prevent crustaceans from escaping.

Figure 12:
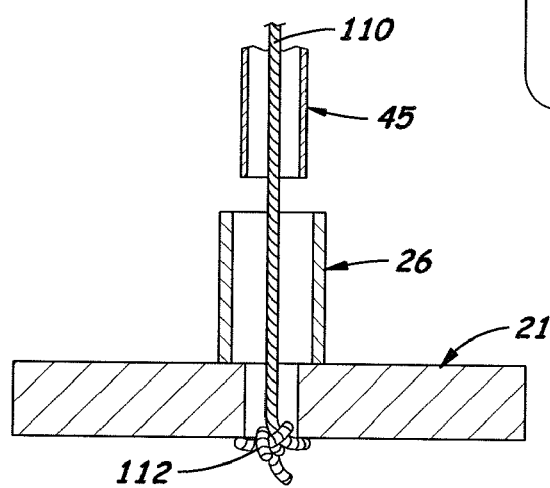
FIG. 12 is a side elevational view of the lower collar showing the mast sliding into and out of a short tube mounted on the lower collar.

In the first embodiment, the lower end of the mast 45 is securely attached to the lower collar 30. In a second embodiment shown in FIG. 12, the mast 45 is extended through a short tube 26 perpendicularly attached to the lower collar 21. During operation, the mast 45 is able to slide freely into the short tube 26. Extending through the mast 45 is an elastic cord 110 which extends through the tube 26 and is tied into a knot 112 on opposite sides of the lower collar 21 to prevent slippage back through the short tube 26. The opposite end of the elastic cord 110 extends through the mast 45 and is also tied in a second knot 113 at its opposite end that is sufficiently large to prevent the cord 110 from being pulled downward in the mast 45 as shown in FIG. 8. During use, the elastic cord 110 biases the mast 45 downward towards so that it engages the short tube 26 to hold the trap 10 in an extended position. The elastic cord 110 also allows the mast 45 to be pulled completely out of the upper collar 30 as shown in FIG. 12 so that the trap 10 may be folded into a compact configuration. Formed on the sides of the upper collar 30 is an optional semi-circular mast slot 115 (see FIG. 6) in which the elastic cord 110 may be inserted to hold the mast 45 in a side-by-side position when the trap 10 is folded into the compact configuration.

Also provided is an optional bait holder 130 which is placed inside the trap 10 when extended to attach crustaceans. In the preferred embodiment, the bait holder 130 is a cylindrical body 132 with at least one removable end cap 134. Holes 135 are formed on the sides of the body 132 to allow particles of bait placed inside the body 132 to escape. A poly rope 136 is attached to the end of the cap 134 and used to hold the body 132 in an elevated position inside the trap 10.

In the preferred embodiment, the upper leg segments 60, lower leg segments 70 and the mast 45 are all made of 1" diameter PVC tubing material. As mentioned above, the trap 10 is designed to fold from a retracted position shown in FIG. 2 when not in use to an extended position shown in FIG. 1 when used to trap crustaceans 10. When retracting the trap 10, the sliding lock 38 mounted on the top surface of the upper collar 30 is released so that the mast 45 or the cord 110 may be pulled upward through the upper collar 30. As the mast 45 or cord 110 is pulled upward, the lower collar 21 is also pulled upward towards the upper collar 30. Simultaneously, the distal ends 71 of the lower leg segments 70 pivot inward which pulls all four feet 80 inward. As the feet 80 are pulled inward, the proximal ends 62 of each upper leg segment 60 pivot over the feet 80 thereby causing the trap 10 to collapse into a compact configuration.

To expand the trap 10, the above described procedure is reversed. Prior to setting the trap 10, the weights 100 may be added or removed from the mast 45 and bait is placed inside the bait holder 130. A main pull cord 120 attached to the upper collar 30 is then used to lower the trap 10 in the body of water.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:
1. A crustacean trap, comprising:
 a. an upper collar;
 b. a lower collar aligned and registered under said upper collar, wherein said lower collar comprises an upper surface and a lower surface;
 c. four upper leg segments being evenly spaced and radially aligned on said upper collar, each said upper leg segment including a distal end and a proximal end, said proximal end of each said upper leg segment being pivotally attached to said upper collar;

d. four lower leg segments being evenly and radially aligned on said lower collar, each said lower leg segment being aligned under one said upper leg segment, each said lower leg segment including a distal end pivotally attached to distal end of said upper leg segment located directly above thereto, said proximal end of each said lower leg segment being pivotally connected to said lower collar;

e. a mast perpendicularly aligned and coupled to said lower collar and extending upward and sliding through said upper collar;

f. a flexible net body surrounding said lower collar, said upper leg segments, said lower leg segments and said mast when extended, said net body includes four side panels and a bottom panel, said net body being connected to said upper and lower leg segments so that when upper collar and said lower collar are forced apart over said mast, said upper and lower leg segments extended outward from said upper collar and said lower collar respectively thereby causing said net body to expand into a pyramid-shape configuration, and when said upper collar and said lower collar are forced together along said mast, said upper leg segments and said lower leg segments fold inward into parallel aligned with said mast and forcing said net body into a collapse configuration;

g. at least one side opening formed on said net body through which a crustacean may enter said trap;

h. means for locking said upper collar on said mast to hold said trap in an extended position;

i. a tube attached substantially perpendicularly to the upper surface of said lower collar, wherein said mast and said tube are slidably engaged with one another; and, j. a pull cord extending through said mast and through said tube, wherein said pull cord is coupled to the lower surface of said lower collar such to prevent slippage of said pull cord back through said tube.

2. The crustacean trap, as recited in claim 1, wherein said pull cord is attached to said upper collar.

3. The crustacean trap, as recited in claim 1, further including a bait holder.

4. The crustacean trap, as recited in claim 3, further including at least one weight.

5. The crustacean trap, as recited in claim 3, further including a triangular-shaped foot disposed between said distal end of said upper leg segment and said distal end of said lower leg segment.

6. The crustacean trap, as recited in claim 1, further including a bait holder.

7. The crustacean trap, as recited in claim 1, further including at least one weight.

8. The crustacean trap, as recited in claim 7, wherein said weight is positioned over said lower collar.

9. The crustacean trap, as recited in claim 8, wherein said weight includes a transversely aligned slot enabling said weight to slide onto said lower collar and around said mast.

10. The crustacean trap, as recited in claim 1, further including at least one weight.

11. The crustacean trap, as recited in claim 10, wherein said weight is positioned over said lower collar.

12. The crustacean trap, as recited in claim 10, further including a triangular-shaped foot disposed between said distal end of said upper leg segment and said distal end of said lower leg segment.

13. The crustacean trap, as recited in claim 1, further including a triangular-shaped foot disposed between said distal end of said upper leg segment and said distal end of said lower leg segment.

14. The crustacean trap, as recited in claim 1, further including a triangular-shaped foot disposed between said distal end of said upper leg segment and said distal end of said lower leg segment.

15. The crustacean trap, as recited in claim 1, wherein said side opening is a one-way opening that prevents a crustacean that enters said trap from escaping.

16. The crustacean trap, as recited in claim 1, wherein said means for locking said upper collar on said mast is a slide connector mounted on said upper collar with a lateral pin that selectively engages a pin bore formed on said mast.

* * * * *